Jan. 18, 1955  D. L. WAUGH  2,699,685
DOUBLE COG BELT
Filed April 29, 1950

INVENTOR.
DALE L. WAUGH
BY
ATT'Y

United States Patent Office 2,699,685
Patented Jan. 18, 1955

2,699,685

DOUBLE COG BELT

Dale L. Waugh, Dayton, Ohio, assignor to The Dayton Rubber Company, a corporation of Ohio Application April 29, 1950, Serial No. 158,958

1 Claim. (Cl. 74—233)

This invention relates to belts, and particularly to V-type transversely grooved power transmission or conveyor type belts.

For belts which are to be run over pulleys of small diameter, great flexibility is of prime importance, while a certain degree of transverse stiffness and rigidity and resistance to lateral compression is also required. While this is important in the case of all belts, it is of special significance when the belt is employed in variable speed power transmissions. Such variable speed power transmission belts must be relatively wide in order to allow contact in every position of the adjustable pulleys and are thus subject to bending from lateral stress to an especially high degree.

Accordingly, it is one object of this invention to provide a belt which has a high degree of longitudinal flexibility and at the same time a high resistance to bending from lateral compression.

It is another object of this invention to provide a belt which has a maximum effective thickness with regard to lateral rigidity and at the same time a minimum effective thickness with regard to longitudinal flexibility.

These and other objects are accomplished by providing a strength layer in the neutral axis zone of the belt and by strengthening the compression and tension zones against lateral compression.

The present application is a continuation-in-part of my copending application Serial No. 601,730 filed June 27, 1945, entitled "Double Cog Belt," now Patent No. 2,514,429 issued July 11, 1950. In that application there is described and claimed novel double cog belts in which the teeth of the compression section possess a greater depth and pitch than those of the tension section and in which several different types of transverse reinforcing members may be utilized.

The invention will be more clearly understood from the following description taken in connection with the accompanying drawings, in which.

Figure 1:
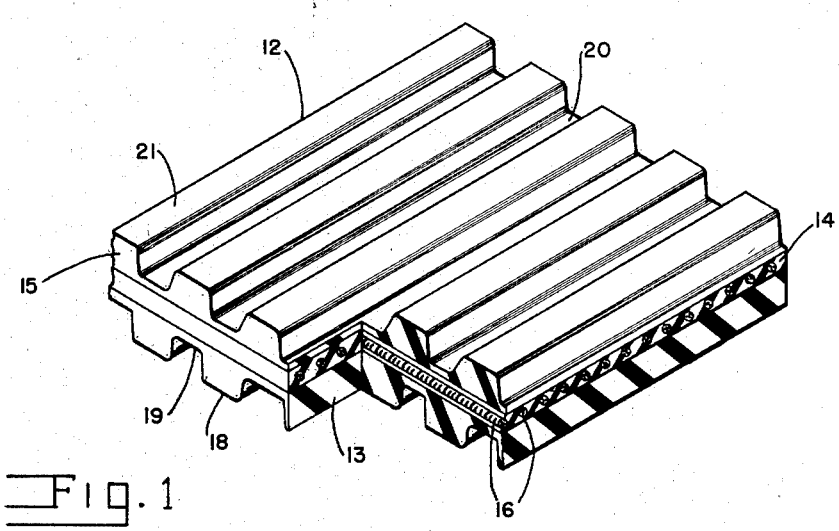
Figure 1 is a perspective view, partly in section, of one embodiment of my invention.

Referring now to the drawings in detail, there is illustrated in Figure 1 belt 12 which comprises the zones 13, 14 and 15 which, for the sake of simplicity and analogous to belt terminology, will be called hereafter compression zone, neutral axis zone, and tension zone, respectively.

The compression zone 13 and the tension zone 15, in the embodiment shown in Figure 1, are built of rubber or rubber-like material which has a high degree of rigidity and the zones are thus resistant to the deformation under lateral compression. Instead of providing lateral reinforcement by making the toothed sections of material having high rigidity, transverse reinforcing members, such as rods, tubes, dowels, or the like, as described below or in my copending application, may be utilized. The neutral axis zone 14 is strengthened by longitudinal cords 16 embedded in a rubber-like composition 17. The compression section is provided with transverse grooves 19 and cogs 18 and the tension section is similarly provided with transverse grooves 20 and cogs 21. It will be noted that the cogs in the tension and compression sections have the same pitch and depth but are staggered. This is for the purpose of avoiding thin, weak sections in the belt and also to distribute the traction surface uniformly along its length. Likewise, if the belt is to be used as a conveyor belt, the lateral stiffening is distributed so as to inhibit bending.

Figure 2:
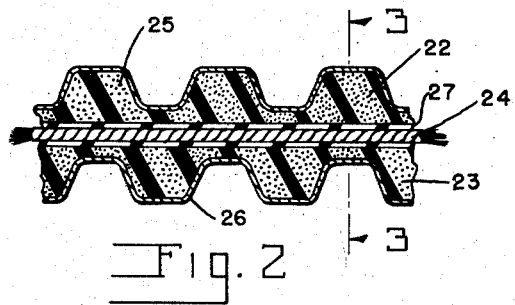
Figure 2 is a longitudinal cross sectional view of another embodiment of my invention.
Figure 3:
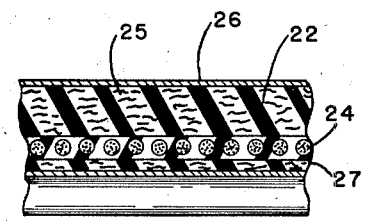
Figure 3 is a transverse cross sectional view of the embodiment of Figure 2 taken along lines 3—3 of Figure 2.

In Figures 2 and 3 another modification of the belt of my invention is illustrated wherein the tension and compression zones 22 and 23, respectively, are reinforced against transverse compression by substantially parallelly arranged fibers 25 embedded in the rubber composition and disposed in the transverse direction of the belt. This particular reinforced rubber composition is generally known in the art as "Stiflex" and comprises a mixture of fibers milled into the rubber composition, usually in proportions of about 5% to 20%. The fibers are generally of cotton, cellulose, rayon or other textile materials and are usually of short random lengths of the order of ¼ in. and less. The longitudinal cords of the neutral axis zone are indicated at 24 and will be seen to be embedded in rubber or a rubber-like composition 27. In this modification the pitch of the grooves and cogs is the same in both sections; however, weak spots are avoided by arranging the cogs in both sections in a staggered relation so that the thickness of the belt is the same all over. The belt of Figures 2 and 3 is preferably wrapped, a fabric layer 26, either straight or preferably bias-laid, surrounding the entire belt body. The transversely arranged fibers have been found to be effective in providing resistance against transverse or lateral compression while at the same time enabling the belt to have good longitudinal flexibility. In the form illustrated in Figures 2 and 3, the depth and pitch of the teeth or cogs in both sections are the same with the teeth being staggered so that the teeth in one section are vertically opposite the grooves in the other section.

Figure 4:
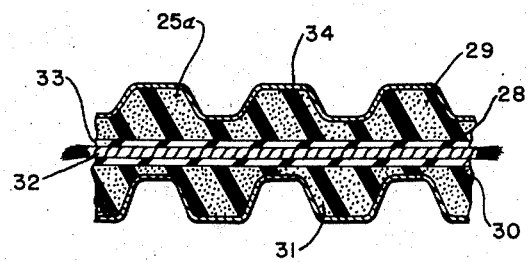
Figure 4 is a longitudinal cross sectional view of another form of my invention.

In Figure 4, another modification is illustrated, in which tension section 28 comprises teeth or cogs 29 and compression section 30 comprises teeth or cogs 31. Neutral axis reinforcing cords 32 are embedded in layer 33 and a fabric cover 34 is applied over the top and bottom surfaces of the belt, or the belt may be completely wrapped. The structure and assembly of this modification are similar to that of Figures 2 and 3 except that the depth of the cogs in the upper or tension section is less than that of those in the compression section. The pitch of the teeth or cogs is the same in both sections but the cogs are staggered so that the grooves of one section are vertically opposite the cogs of the other section. The cogs may be reinforced against lateral compression by forming them of relatively hard, rigid rubber, or may contain transversely disposed fibers as described in Figures 2 and 3. As in Figure 2, transverse fibers 25a are provided either in the teeth alone or throughout the tension and compression sections.

Figure 5:
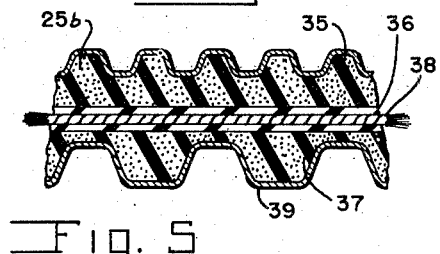
Figure 5 is a longitudinal cross sectional view of an additional form of the invention.

Figure 5 illustrates a form of the invention wherein the cogs of the compression section have a greater pitch and greater depth than in the tension section, with transverse fibers reinforcing the cogs of both sections. In this figure, 35 is the tension section, 36 the compression section, 37 the neutral axis section, 38 the longitudinal cord reinforcement, 39 the transverse fiber reinforcement arranged in a manner similar to that in Figures 2 and 3, and 40 the fabric wrapping. The transverse reinforcing fibers similar to those used in Figures 2-4 are shown at 25b.

It will be understood that a great number of inextensible materials are suitable for the neutral axis strength band. Thus, for example, rayon, cotton or other textile cords as well as fabric cables, metal mesh, metal bands, plain or perforated, may be used with equal satisfaction.

The use of transverse fibers has been found especially advantageous in making belts of the type described. The fibers may be compounded in the rubber composition and no problems of cohesion are presented as in the case of other types of reinforcement. Furthermore, the degree of lateral rigidity may be carefully controlled by adjusting the fiber content of the composition.

By employing grooves of different depth, shape and spacing, the flexibility of the belts may be varied as desired.

It will be readily understood that the belts of this invention have a high longitudinal flexibility and at the same time a high resistance to bending from lateral compression. Furthermore the belts of my invention have a maximum overall thickness and therefore a high degree of rigidity and at the same time extremely thin sections which provide for a high flexibility.

The belts of my invention are preferably made by preforming the cog sections by a press mold plate and then meshing one preformed cog section into a matrix which is arranged on a drum. On this drum the belt body is built by superimposing the various layers, the innermost and outermost layers being formed by a matrix. The belt body, together with the matrices, is then cut into parts corresponding to the approximate size desired of the belts, and the belts with the matrices are then cured in a smooth-surfaced mold. After the belts have been cured, the top and bottom matrices are removed from the cogs. In case that a wrapped belt is to be produced it is possible to form the cogs in the belt after it has been wrapped by curing it in a mold having a properly cogged surface.

The belts described above may be used as conveyor or as power or traction belts. They are characterized by great lateral incompressibility, without thereby impairing their flexibility so that they may be run over pulleys of small diameter.

The term "rubber" as used herein, is intended to and does include rubber compositions comprising natural rubber, synthetic rubbers, or mixtures thereof, as well known to the art.

It will be understood that it is desired to be comprehended within this invention such modifications as may be necessary to adapt it to varying conditions and use.

I claim:

A V-type rubber-containing belt comprising compression, neutral axis and tension sections, said neutral axis section having longitudinal reinforcing elements embedded in rubber, transversely extending cogs formed in said compression and tension sections, said cogs comprising rubber composition having textile fibers incorporated therewith, said fibers extending transversely of said belt to impart lateral rigidity to said cogs, the cogs in the compression section having a greater pitch and a greater depth than the cogs in the tension section.

References Cited in the file of this patent

UNITED STATES PATENTS

| | | |
|---|---|---|
| 1,890,080 | Freedlander | Dec. 6, 1932 |
| 2,065,180 | Freedlander | Dec. 22, 1936 |
| 2,514,429 | Waugh | July 11, 1950 |

FOREIGN PATENTS

| | | |
|---|---|---|
| 365,293 | Great Britain | Jan. 21, 1932 |